(No Model.) 2 Sheets—Sheet 1.
D. L. CROFT.
MOTOR.
No. 283,757. Patented Aug. 28, 1883.
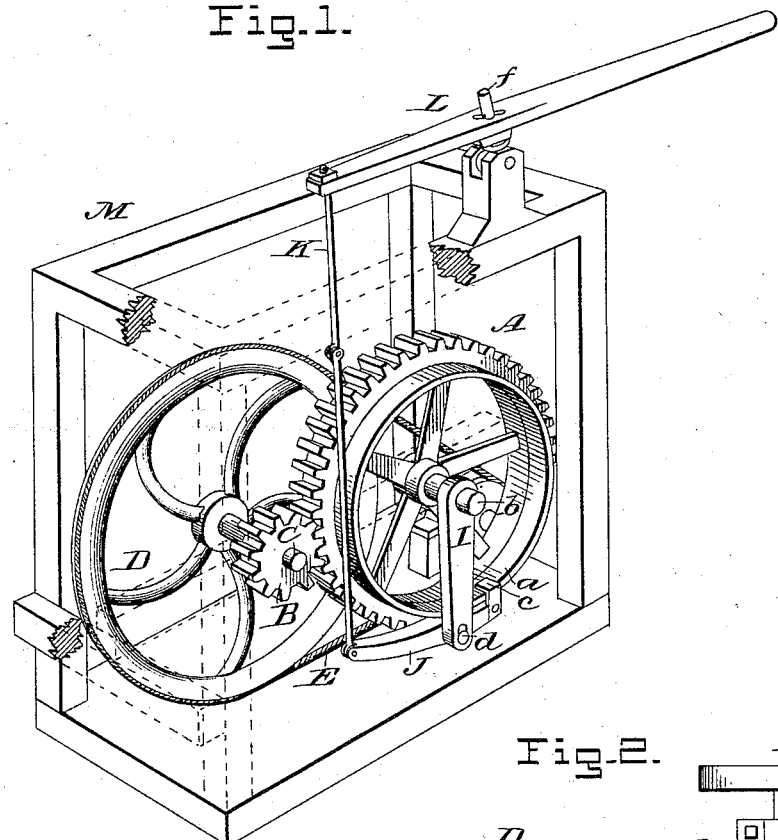
Fig. 1.
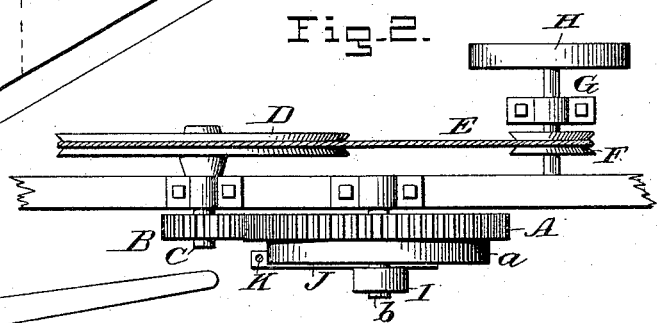
Fig. 2.
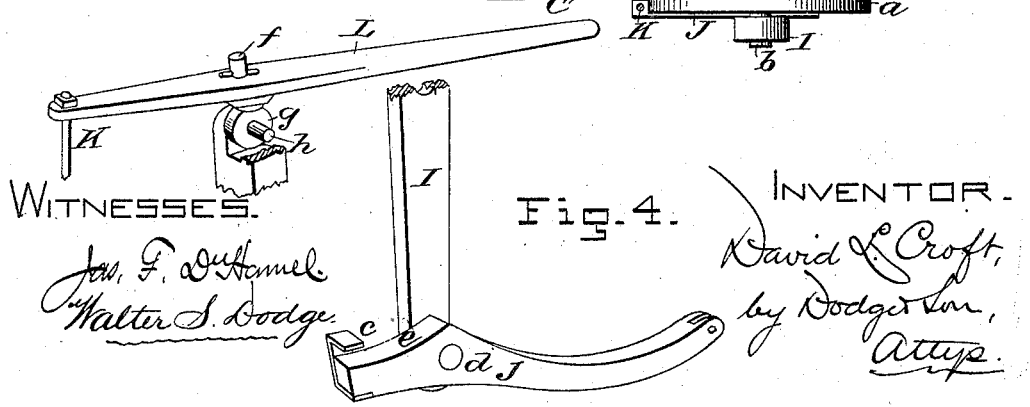
Fig. 3.
Fig. 4.
WITNESSES.
Jas. F. DuHamel.
Walter S. Dodge.
INVENTOR.
David L. Croft,
by Dodge Son,
Attys.

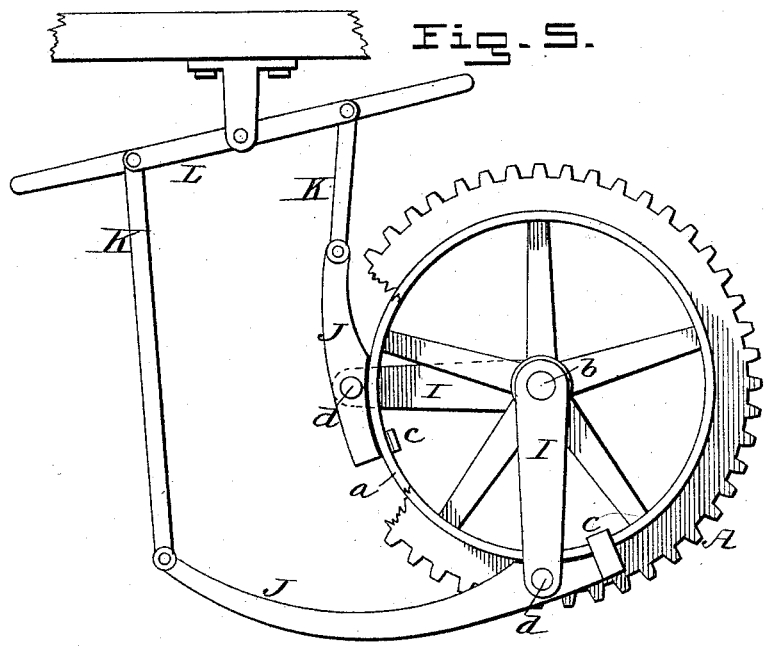

UNITED STATES PATENT OFFICE.

DAVID L. CROFT, OF SPRINGFIELD, OHIO.

MOTOR.

SPECIFICATION forming part of Letters Patent No. 283,757, dated August 28, 1883.

Application filed July 19, 1883. (No model.)

*To all whom it may concern:*

Be it known that I, DAVID L. CROFT, of Springfield, in the county of Clarke and State of Ohio, have invented certain Improvements in Motors, of which the following is a specification.

My invention relates to motors designed to be operated manually for driving light machinery or performing light work requiring a regular and constant motion; and it consists in providing a main driving-wheel, from which power and motion are taken by suitable gearing, with an annular rim or band and arranging a clutch or friction clamp upon an arm mounted to swing about the shaft of the driving-wheel in such manner that when a hand-lever or equivalent device is moved to raise the clutch said clutch will engage the rim and move the wheel, but that upon the reverse motion the clutch will disengage and ride freely back upon said rim, as hereinafter more fully explained.

In the annexed drawings, Figure 1 represents a perspective view of my improved machine; Fig. 2, a top plan view of the same; Fig. 3, a perspective view of the operating-lever and its mounting; Fig. 4, a perspective view of the clutch and its carrying-arm; Fig. 5, a side elevation of a double arrangement for driving at both strokes of the lever.

The object of my invention is to provide a small motor capable of manipulation by cheap unskilled labor, and capable of driving light machinery—such, for instance, as sewing-machines, churns, portable forges, sawing machinery, &c.—and to this end I construct my motor as represented in the annexed drawings, in which A indicates a main driving-wheel, toothed or formed with cogs to mesh with and impart motion to a pinion, B, which is secured upon a shaft, C, carrying a balance-wheel, D.

From the wheel D a band may be passed directly to the machinery to be driven; or, if very high speed be required, the band E may be carried about a pulley, F, the shaft G of which also carries a band-pulley or transmitting-wheel, H, the extent of gearing and multiplication of speed being of course carried to any extent required by the use to which the machine is to be put.

The wheel A is furnished with a laterally-projecting annular rim or flange, *a*, and suspended from or journaled upon the shaft or axle *b* of said wheel is an arm, I, which extends somewhat beyond the rim *a*, and has pivoted to it a lever, J, the long arm of which is connected by a jointed rod or pitman, K, to a hand-lever, L, pivoted at the top of the frame M of the machine. The shorter arm of the lever J is curved to conform to the outer face of the rim *a*, and its end is furnished with a hook or overhanging finger, *c*, which passes over the edge of the rim and lies upon the inner face thereof, as more plainly indicated in Figs. 1 and 4. Under this arrangement an upward pull upon the long arm of lever J causes the arm I to swing slightly in the direction of such pull, the curved face of lever J to be brought against the rim *a*, and the finger or hook *c* to be pressed against the inner face of the rim, thereby forming a fulcrum for the lever J and causing its curved face to be pressed firmly against the rim, so that further upward movement will cause the lever and arm I to swing about shaft or axle *b*, and to carry with it the rim *a* and the wheel to which said rim is secured or upon which it is formed.

A slight play or lost motion may advantageously be permitted to take place between arm I and shaft *b* or at the pivot *d*, connecting lever J to said arm, to permit the lever to be brought more perfectly in contact with the rim throughout the curved bearing-face of the lever. A downward movement of the long arm of the lever J causes the bearing-face *e* to free itself from the rim, and carries both the lever J and its supporting-arm I back to their first position preparatory to a second action.

The lever J and arm I may be duplicated, if desired, and connected with the hand-lever L on opposite sides of its pivot, as indicated in Fig. 5, thereby securing a positive action at both the up and the down stroke of the lever. When this plan is adopted, it will be found advantageous to provide the wheel A with two rims, one on each side, and to arrange one clutch to act upon each rim, though both may be on one rim.

The hand-lever L is mounted upon a stem or pin, *f*, which permits it to be moved in a horizontal plane to suit the position of the operator, and said pin *f* is provided with a perforated disk or hub, *g*, through which passes the horizontal pivot-pin $h$, as shown in Fig. 3. This mode of mounting the lever is simple and strong, and allows a very convenient and desirable range of movement horizontally. The fly-wheel causes a steadiness and continuity of motion, nothwithstanding the alternating action of the clutch under the single-acting arrangement.

I am aware that a variety of devices have been proposed, in which pawls and ratchets were to be used in a manner somewhat analogous to my friction-clutch; but the plan herein described is noiseless and wears but very little in use, besides being, as I believe, more efficient than the devices hitherto proposed.

Having thus described my invention, what I claim is—

1. The herein-described motor, consisting of wheel A, provided with rim $a$, pinion B, and wheel C, arm I, journaled upon the axle of wheel A, friction-lever J, pivoted to arm I and provided with hook $c$, arranged to engage over rim $a$, lever L, and connecting-rod K, all arranged to operate substantially as explained.

2. In a motor, substantially such as described and shown, the combination, with a wheel provided with a laterally-projecting flange, of an arm journaled concentrically with said wheel, and a lever pivoted to said arm, curved to conform to the outer face of the rim and provided with a hook to engage with the inner face of the rim, substantially as shown and described.

3. In a motor, substantially such as described and shown, a vertically-moving hand-lever mounted upon a pivot, substantially such as shown and described, whereby it is adapted also to be moved in a horizontal plane.

4. In a motor, substantially such as described, hand-lever L, mounted upon an upright pin, $f$, provided with perforated disk $g$, supported by a pivot-pin, $h$, as shown.

5. In a motor, substantially such as described and shown, the combination, with a wheel provided with a laterally-projecting flange, of an arm journaled concentrically with said wheel, and a lever pivoted to said arm, curved to conform to the outer face of the rim and provided with a hook to engage with the outer face of the rim, substantially as shown and described, the pivot of said lever having a slight play to and from the center of the wheel.

DAVID L. CROFT.

Witnesses:
J. W. STAYMAN,
H. S. SHOWERS.